(12) United States Patent
Chuang

(10) Patent No.: US 6,615,704 B2
(45) Date of Patent: Sep. 9, 2003

(54) TIRE PUMP HANDLE THAT MAY BE OPERATED BETWEEN A LOCKING POSITION AND A NON-LOCKING POSITION BY ONE HAND ONLY

(76) Inventor: Louis Chuang, 7F-8, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 10/015,474

(22) Filed: Dec. 13, 2001

(65) Prior Publication Data

US 2003/0110936 A1 Jun. 19, 2003

(51) Int. Cl.[7] ............................................... F15B 15/26
(52) U.S. Cl. ....................................................... 92/58.1
(58) Field of Search ........................... 92/58.1, 59, 128

(56) References Cited

U.S. PATENT DOCUMENTS

| | | | | |
|---|---|---|---|---|
| 4,569,275 A | * | 2/1986 | Brunet | 92/58.1 |
| 5,443,370 A | * | 8/1995 | Wang | 92/59 |
| 6,506,026 B2 | * | 1/2003 | Wu | 92/58.1 |

* cited by examiner

Primary Examiner—Edward K. Look
Assistant Examiner—Igor Kershteyn
(74) Attorney, Agent, or Firm—Alan D. Kamrath; Rider Bennett, LLP.

(57) ABSTRACT

A tire pump includes a reciprocal member having a first end and a second end, and a handle having a first end and a second end. The first end of the handle is mounted on the second end of the reciprocal member. The handle includes a switch member mounted on the first end thereof. The switch member may be operated by a user's one hand only so that the switch member may be moved between a first position where the second end of the reciprocal member is fixed on the first end of the handle, and a second position where the second end of the reciprocal member may be retracted into the first end of the handle.

18 Claims, 12 Drawing Sheets

TIRE PUMP HANDLE THAT MAY BE OPERATED BETWEEN A LOCKING POSITION AND A NON-LOCKING POSITION BY ONE HAND ONLY

BACKGROUND OF THE INVENTION

1. Field of the Invention

The present invention relates to a tire pump handle, and more particularly to a tire pump handle that may be operated between a locking position and a non-locking position by a user's one hand only.

2. Description of the Related Art

A tire pump for a bicycle often includes a handle and a retractable device mounted on the handle so that the tire pump may be retracted to be mounted on the frame of the bicycle.

A conventional retractable tire pump handle 1 in accordance with the prior art shown in FIGS. 10–12 comprises a fixing member 101, a cylinder 104, two symmetric semi-circular casings 105, a positioning member 108, a spring 200, and an adjusting member 201.

The fixing member 101 is secured to a piston 100 of the tire pump. The fixing member 101 has a square hole 102 and has an outer wall formed with two opposite stop blocks 103. The two symmetric semi-circular casings 105 are-received in the cylinder 104. Each of the two symmetric semi-circular casings 105 is formed with an L-shaped guide slot 106 having a stop zone 1061, and has a first end having an inner edge provided with a positioning block 107 and a second end mounted on the fixing member 101 so that the stop block 103 may slide in the guide slot 106. The positioning member 108 is formed with a square hole 109 and has a periphery formed with multiple depressions 110. The positioning member 108 is secured in the first end of each of the two symmetric semi-circular casings 105, and the depressions 110 are combined with the positioning blocks 107. The spring 200 is mounted between the fixing member 101 and the positioning member 108. The adjusting member 201 is provided with a square post 202 that may extend through the cylinder 104, the square hole 109 of the positioning member 108 and the square hole 102 of the fixing member 101.

As shown in FIG. 11, the user's one hand may hold the cylinder 104 and his other hand may hold and rotate the adjusting member 201, whereby the square post 202 may rotate the fixing member 101 which drives the stop block 103 to move into the stop zone 1061, so that the fixing member 101 is secured in the casings 105, and cannot be retracted into the casings 105.

As shown in FIG. 12, the user's one hand may hold the cylinder 104 and his other hand may hold and rotate the adjusting member 201, whereby the square post 202 may rotate the fixing member 101 which drives the stop block 103 to detach from the stop zone 1061 and to slide in the guide slot 106, so that the fixing member 101 is released from the casings 105, and may be retracted into the casings 105. Thus, the tire pump handle 1 is retractable relative to the piston 100, so that the tire pump may be retracted to be mounted on the frame of the bicycle.

However, the conventional retractable tire pump handle 1 in accordance with the prior art has the following disadvantages.

The square post 202 of the adjusting member 201 is rubbed with the square hole 109 of the positioning member 108 and the square hole 102 of the fixing member 101, thereby producing friction therebetween, so that the square post 202 of the adjusting member 201 is easily worn out during long-term utilization, thereby affecting operation of the conventional retractable tire pump handle 1.

The user's one hand has to hold the cylinder 104 and his other hand has to hold and rotate the adjusting member 201, so that the conventional retractable tire pump handle 1 cannot be operated by the user's one hand only, thereby causing inconvenience in use.

SUMMARY OF THE INVENTION

The present invention has arisen to mitigate and/or obviate the disadvantage of the conventional tire pump handle.

The primary objective of the present invention is to provide a tire pump handle that may be operated between a locking position and a non-locking position by one hand only, wherein the operation knob of the switch member may be driven and moved by the user's one hand only, so that the handle of the tire pump may be operated between a locking position and a non-locking position by the user's one hand only, thereby greatly facilitating the user operating the handle of the tire pump, and thereby greatly enhancing the versatility of the tire pump.

Another objective of the present invention is to provide a tire pump handle that may be operated between a locking position and a non-locking position by one hand only, wherein the tire pump has a simple construction, and the parts of the tire pump may be manufactured easily, thereby facilitating fabrication of the tire pump, and thereby saving cost of fabrication.

In accordance with the present invention, there is provided a tire pump, comprising:

a reciprocal member having a first end and a second end; and a handle mounted on the reciprocal member and having a first end and a second end, the first end of the handle mounted on the second end of the reciprocal member, the handle including a switch member mounted on the first end thereof, wherein the switch member may be operated by a user's one hand only so that the switch member may be moved between a first position where the second end of the reciprocal member is fixed on the first end of the handle, and a second position where the second end of the reciprocal member may be retracted into the first end of the handle.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
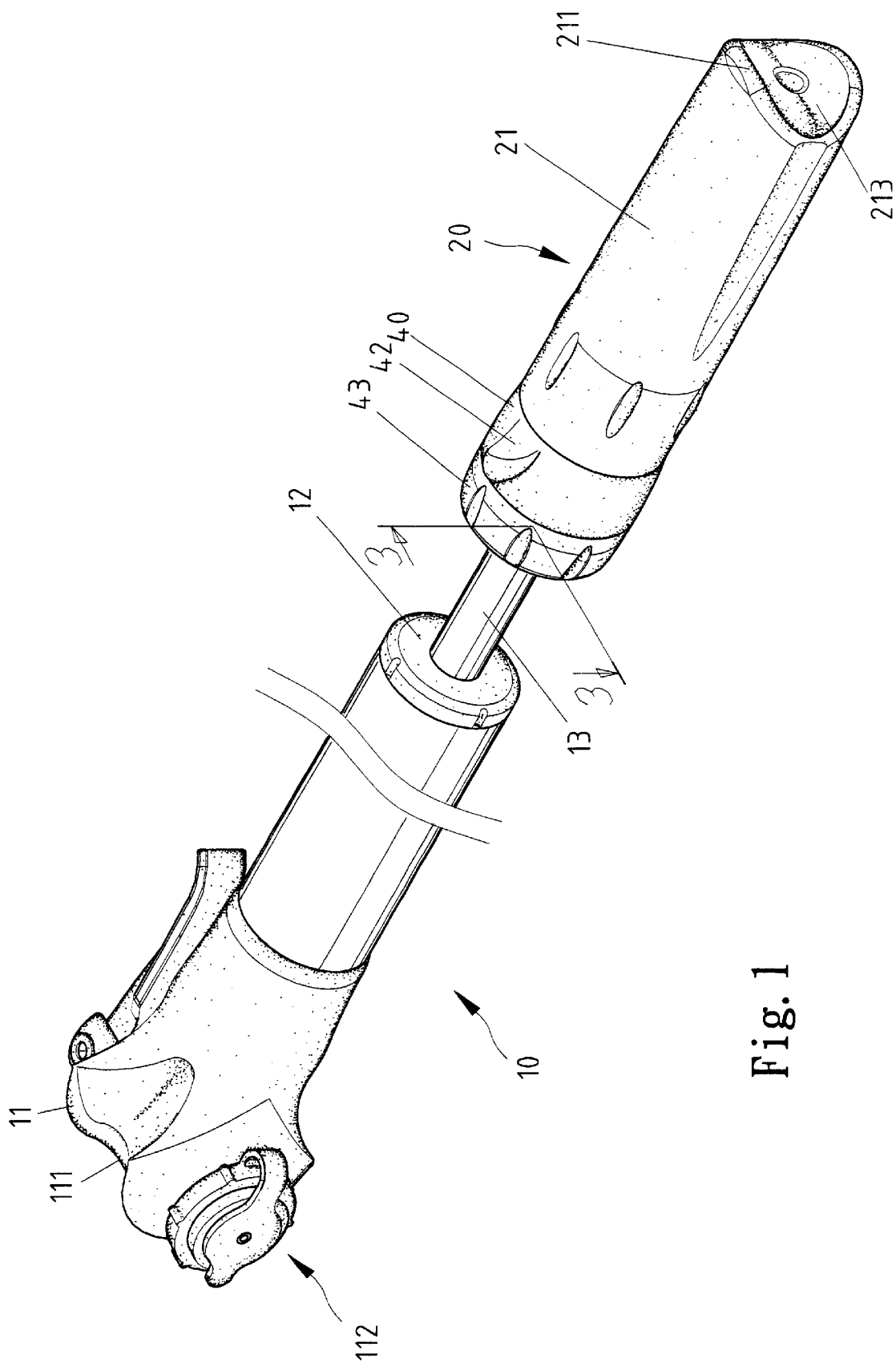
FIG. 1 is a perspective view of a tire pump in accordance with a preferred embodiment of the present invention.
Figure 2:
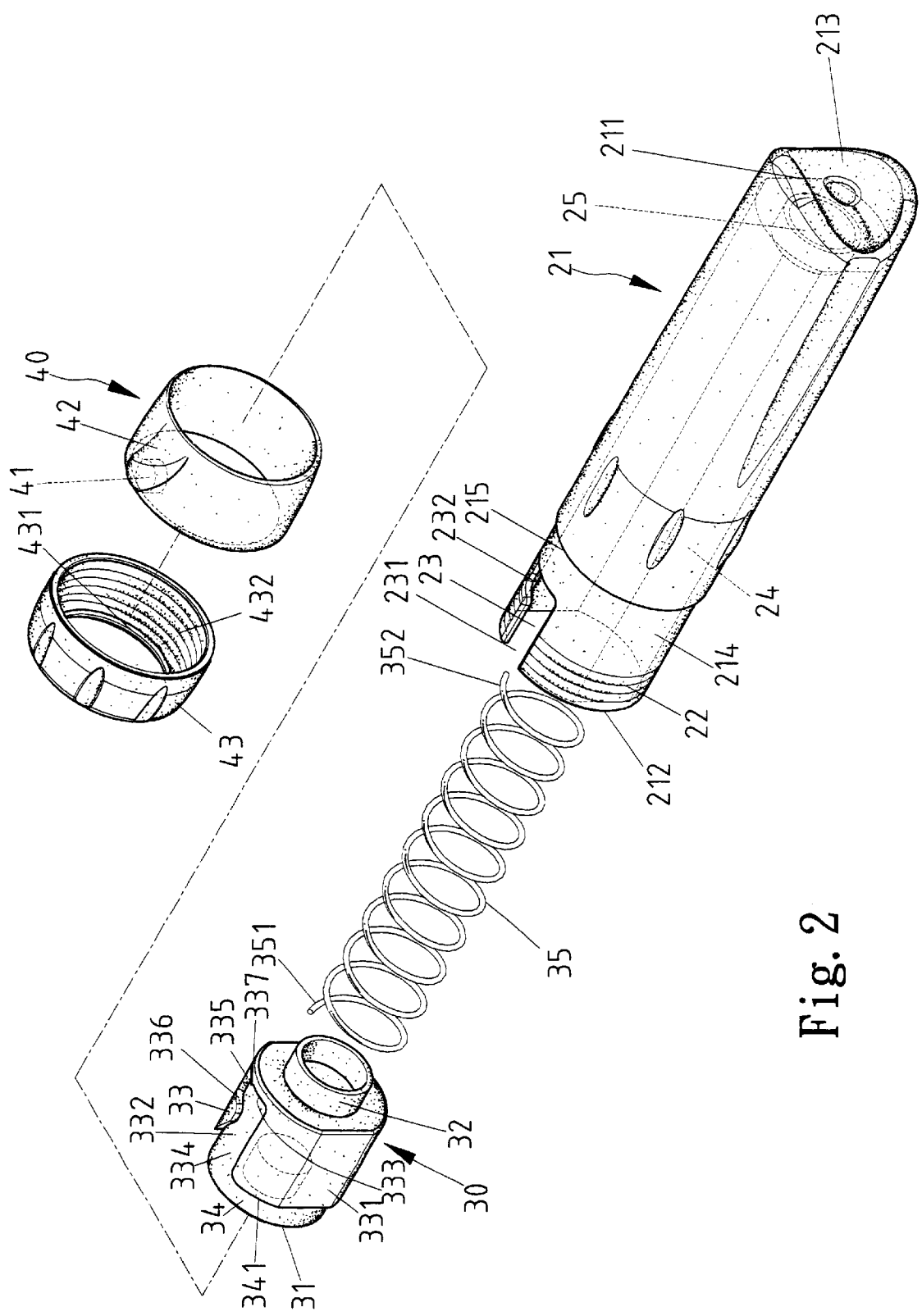
FIG. 2 is a exploded perspective assembly view of a tire pump handle that may be operated between a locking position and a non-locking position by one hand only in accordance with a preferred embodiment of the present invention.
Figure 3:
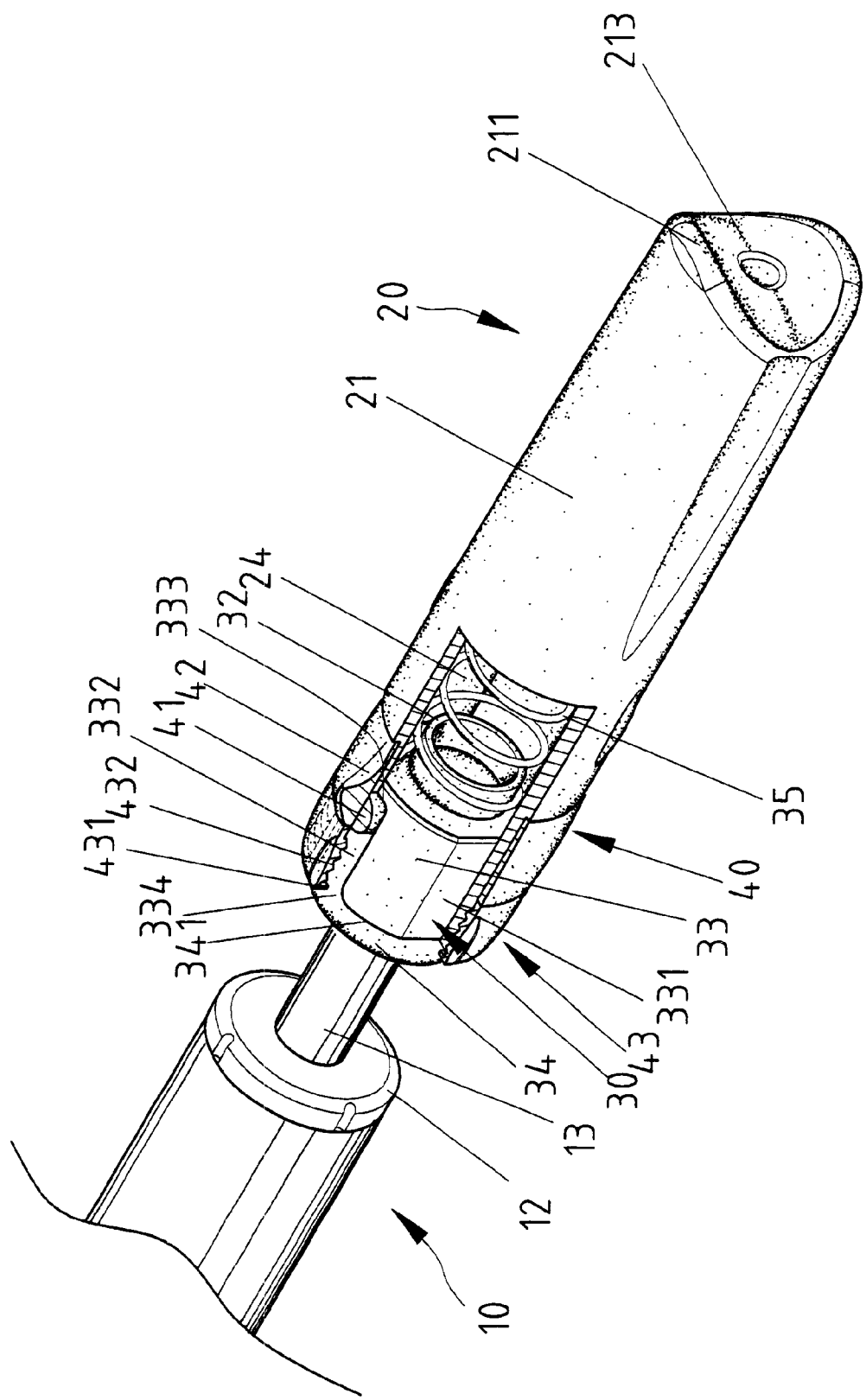
FIG. 3 is a partially cut-away perspective assembly view of the tire pump handle that may be operated between a locking position and a non-locking position by one hand only as shown in FIG. 2, wherein the tire pump handle is disposed at a non-locking position.

Referring to the drawings and initially to FIGS. 1–3, a tire pump for a bicycle in accordance with a preferred embodiment of the present invention comprises a cylinder 10 having a first end 11 formed with a concave 111 and provided with a nozzle head 112, a piston 13 slidably mounted in the cylinder 10 from the second end 12 of the cylinder 10, and a handle 20 releasably secured on the piston 13 for driving the piston 13 to move in the cylinder 10 reciprocally so as to eject air outward from the nozzle head 112. Thus, the piston 13 may function as a reciprocal member.

The handle 20 includes a hollow handgrip 21, a fixing member 30, an elastic member 35, a switch member 40, and a rotary cap 43.

The handgrip 21 has a first end formed with an opened end 211 and a second end formed with a closed end 211. The closed end 211 is formed with a concave 213. The opened end 212 has an outer wall formed with a rotation zone 214 whose outer diameter is slightly smaller than that of the handgrip 21, thereby defining a step 215 therebetween. The rotation zone 214 is formed with an outer thread 22 connected to the opened end 212, and is formed with an L-shaped guide slot 23 which has a first section formed with an opening 231 connected to the opened end 212 and a second section vertical to the first section and formed with a retaining zone 232. The handgrip 21 has an inner wall formed with a locking portion 24, and is provided with a lug 25 located adjacent to the closed end 211.

The fixing member 30 is slidably mounted in the handgrip 21, and includes a cylindrical body 34 and a retaining portion 33 formed on an outer periphery of the cylindrical body 34. A step 341 is formed between the retaining portion 33 and the cylindrical body 34. The cylindrical body 34 has a first end 31 secured to the piston 13 and a second end formed with a protruded portion 32. The retaining portion 33 has two sides formed with two opposite locking planes 331. The retaining portion 33 is formed with an L-shaped slide channel 332 aligned with the guide slot 23 of the handgrip 21. The slide channel 332 has an inner end wall 333 and an opened end 334. The inner end wall 333 is vertically connected to a side stop wall 335 which is connected to a stop wall 336. The inner end wall 333 has a mediate portion formed with a catch block 337. The fixing member 30 may be mounted in the inner wall of the opened end 212 of the handgrip 21, and the two locking planes 331 may be secured in the locking portion 24 of the handgrip 21, so that the fixing member 30 will not rotate relative to the handgrip 21.

The elastic member 35 is mounted in the handgrip 21 and has a first end 351 secured to the protruded portion 32 of the cylindrical body 34 of the fixing member 30, and a second end 352 secured to the lug 25 of the handgrip 21.

The switch member 40 is rotatably mounted on the rotation zone 214 of the handgrip 21, and has an inner wall provided with a stop knob 41 and an outer wall provided with an operation knob 42 aligned with the stop knob 41. The stop knob 41 of the switch member 40 is extended into the guide slot 23 of the handgrip 21 and the slide channel 332 of the retaining portion 33 of the fixing member 30, and is rested on the inner end wall 333 of the slide channel 332 of the retaining portion 33 of the fixing member 30, thereby preventing the fixing member 30 from detaching from the opened end 212 of the handgrip 21.

The rotary cap 43 is secured on the opened end 212 of the handgrip 21, and has an inner wall formed with an inner thread 432 screwed on the outer thread 22 of the opened end 212 of the handgrip 21 for retaining the switch member 40 on the handgrip 21. The inner wall of the rotary cap 43 is formed with a stop flange 432 rested on the step 341 of the fixing member 30, thereby preventing the fixing member 30 from detaching from the opened end 212 of the handgrip 21.

In operation, referring to FIG. 3, the stop knob 41 of the switch member 40 is extended into the guide slot 23 of the handgrip 21 and the slide channel 332 of the retaining portion 33 of the fixing member 30, so that the fixing member 30 of the handle 20 may slide in and retract into the handgrip 21 of the handle 20.

Figure 4:
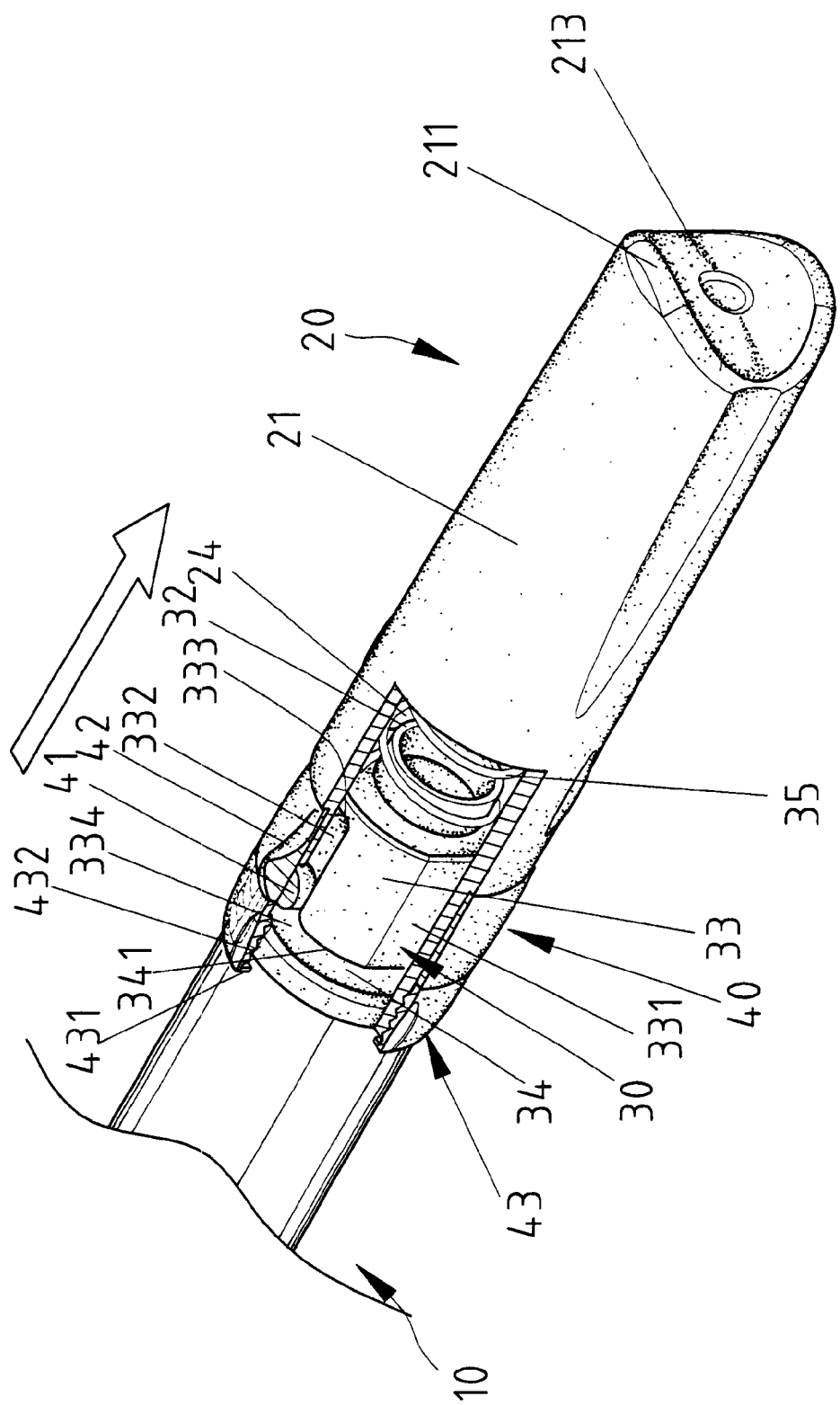
FIG. 4 is a schematic operational view of the tire pump handle that may be operated between a locking position and a non-locking position by one hand only as shown in FIG. 3 in use.

As shown in FIG. 4, when the handgrip 21 of the handle 20 is pushed toward the cylinder 10, the piston 13 is retracted into the cylinder 10 until the first end 31 of the cylindrical body 34 of the fixing member 30 of the handle 20 is rested on the second end 12 of the cylinder 10. Then, the first end 31 of the cylindrical body 34 of the fixing member 30 of the handle 20 is pressed by the second end 12 of the cylinder 10, so that the fixing member 30 of the handle 20 may be retracted into the handgrip 21 of the handle 20 and part of the cylinder 10 may be retracted into the handgrip 21 of the handle 20, thereby shortening the axial length of the tire pump. At the same time, the stop knob 41 of the switch member 40 slides in the slide channel 332 of the retaining portion 33 of the fixing member 30 during movement of the fixing member 30.

Figure 5:
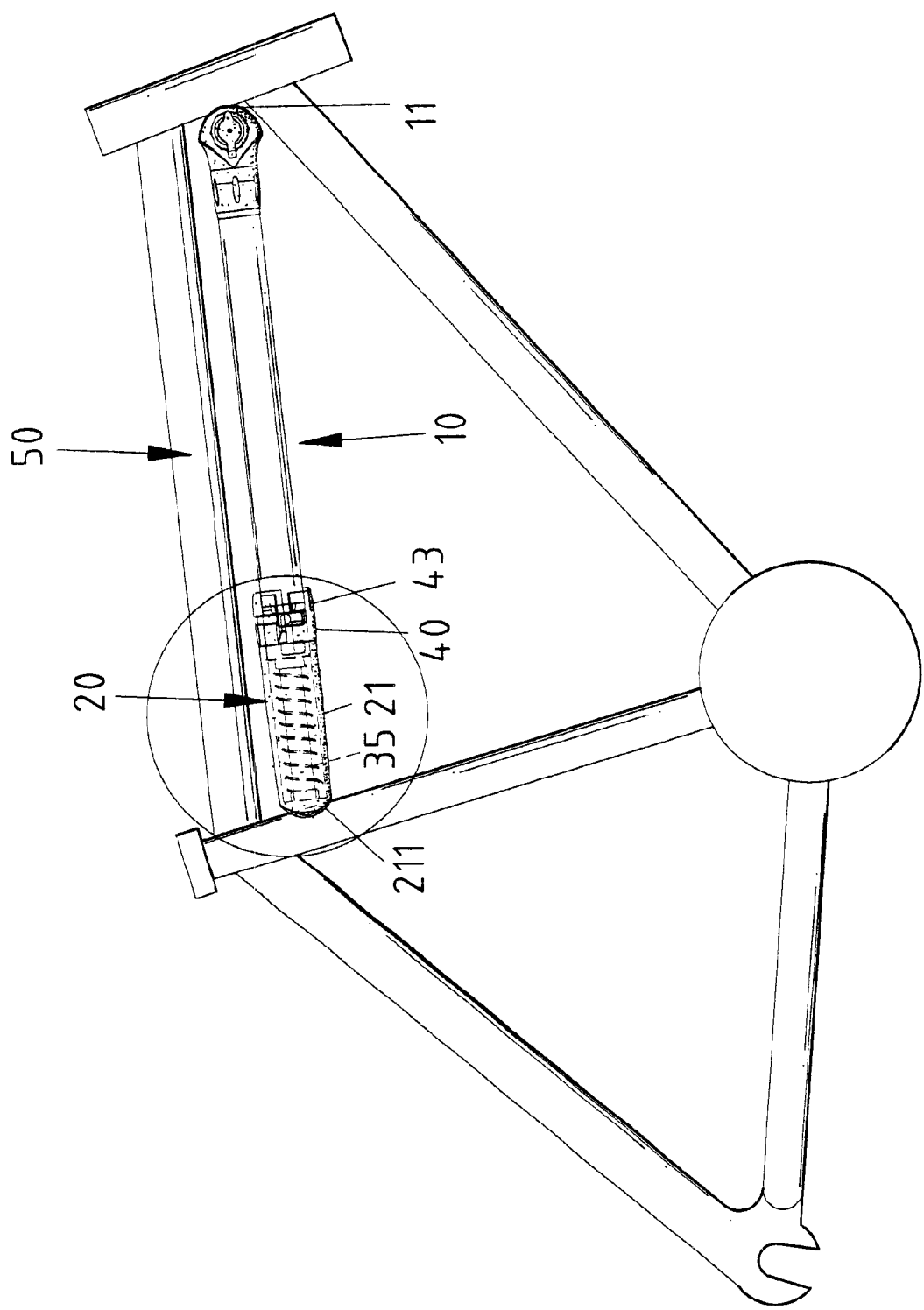
FIG. 5 is a schematic plan view of the tire pump in accordance with the preferred embodiment of the present invention, wherein the tire pump is mounted on the frame of a bicycle.
Figure 6:
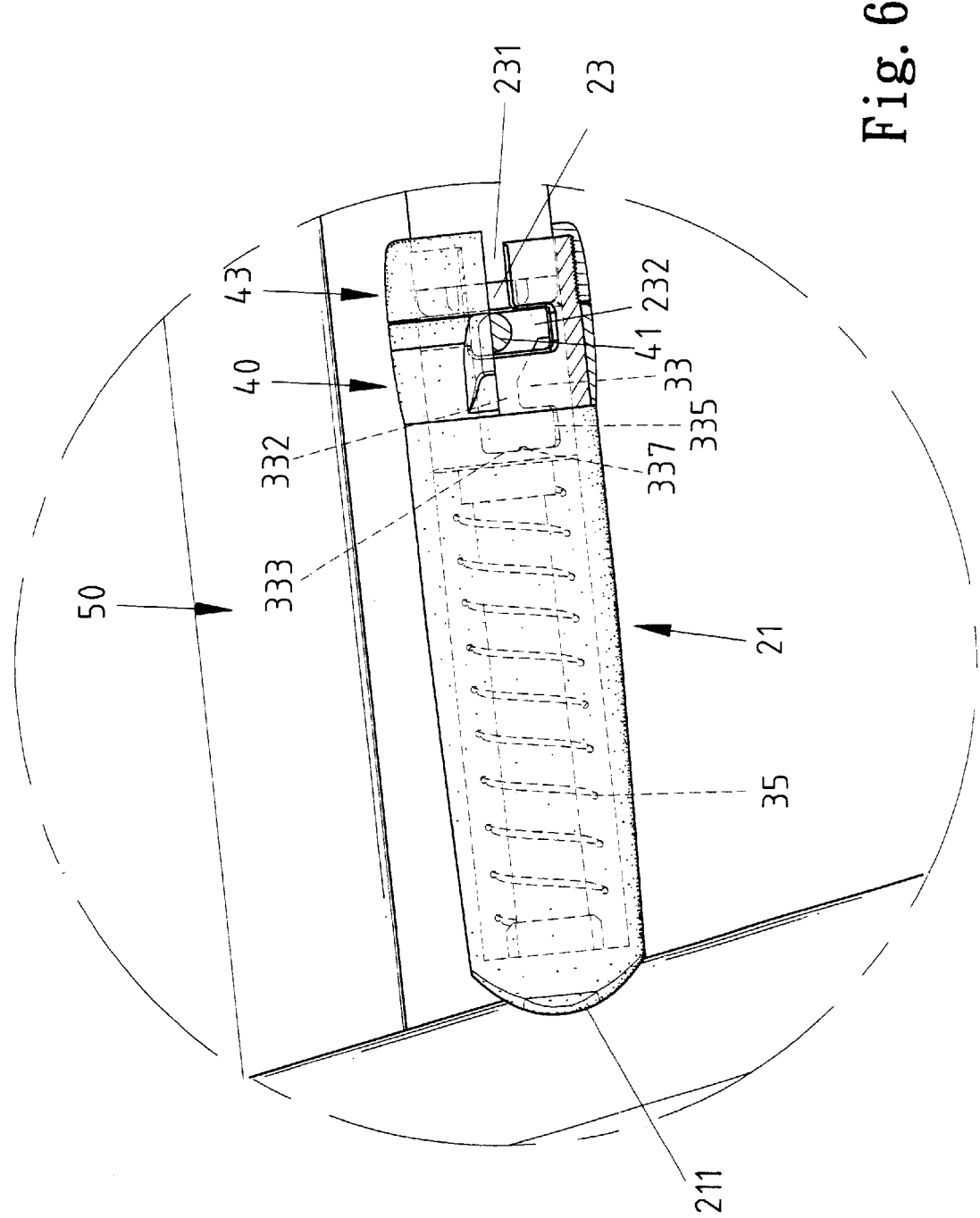
FIG. 6 is a locally enlarged view of FIG. 5.

As shown in FIGS. 5 and 6, the tire pump includes the cylinder 10 and the handle 20. After the axial length of the tire pump is slightly shortened, the tire pump may be secured on the frame 50 of the bicycle. On the contrary, the cylinder 10 may be further retracted into the handgrip 21 of the handle 20 partially, so that the tire pump may be detached from the frame 50 of the bicycle.

Figure 7:
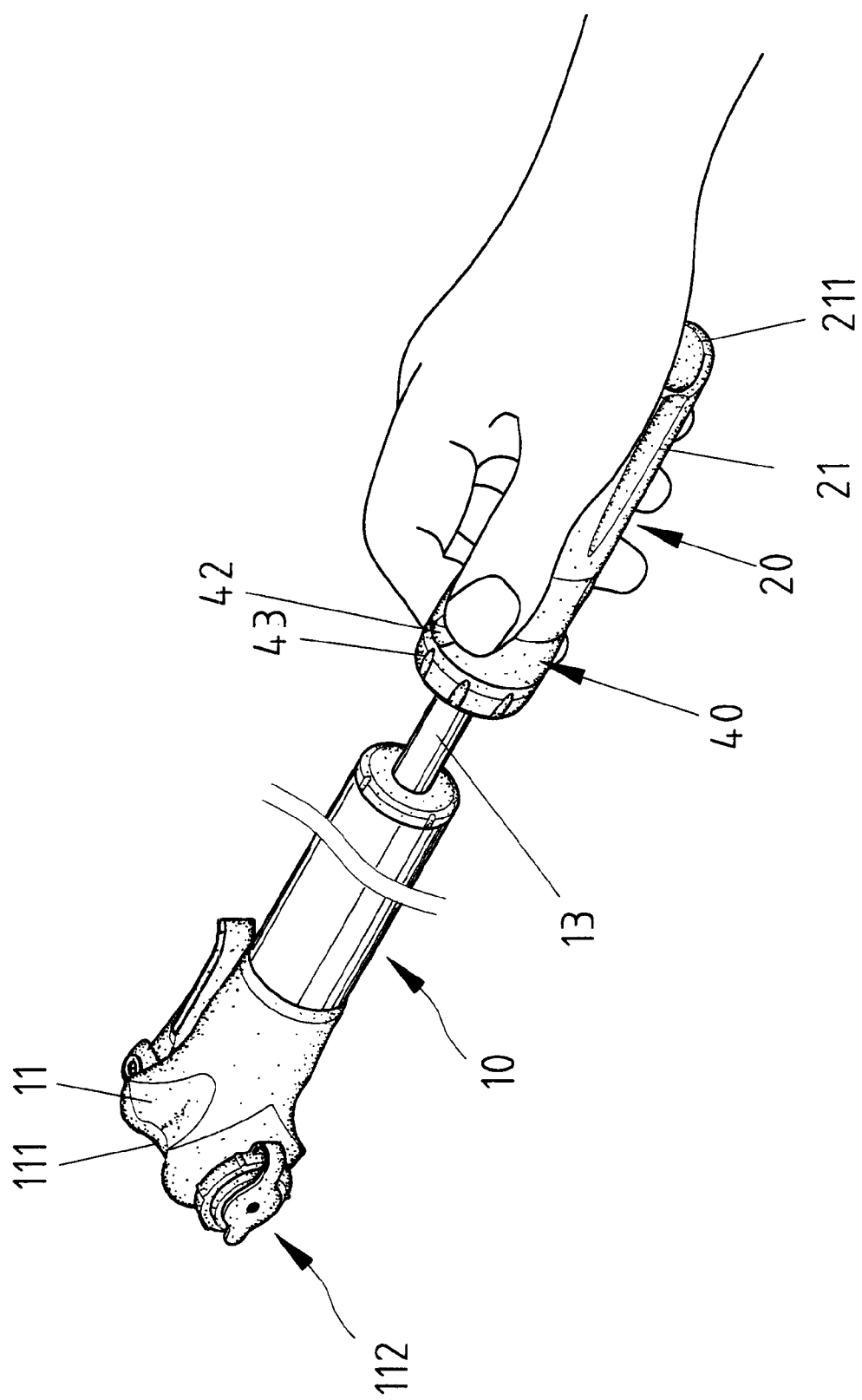
FIG. 7 is a schematic operational view of the tire pump handle that may be operated between a locking position and a non-locking position by one hand only as shown in FIG. 1 in use.
Figure 8:
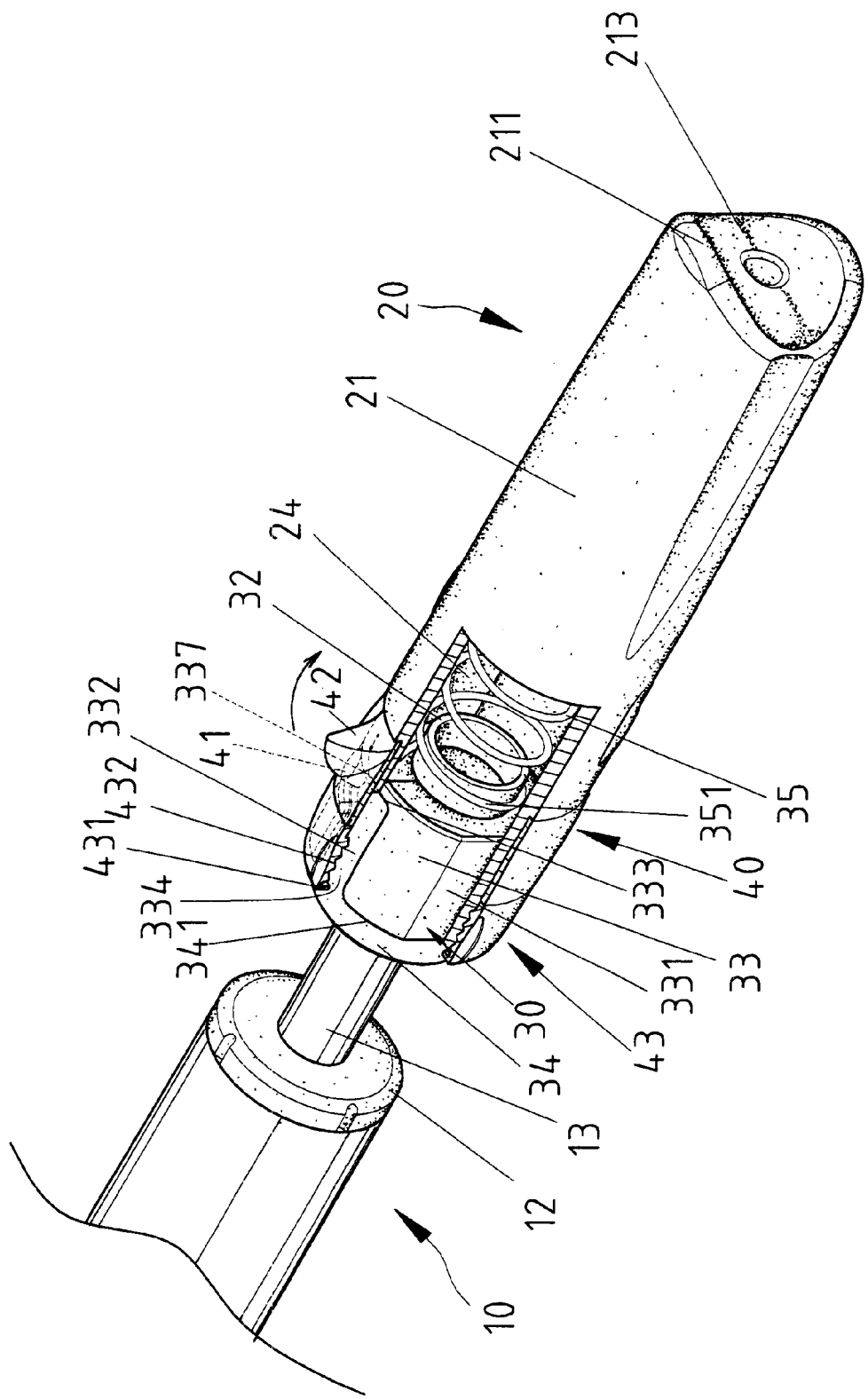
FIG. 8 is a partially cut-away perspective assembly view of the tire pump handle that may be operated between a locking position and a non-locking position by one hand only as shown in FIG. 2, wherein the tire pump handle is disposed at a locking position.

As shown in FIGS. 7 and 8, when the user wishes to proceed the tire pumping action, the operation knob 42 of the switch member 40 may be moved by the user's one hand only, whereby the switch member 40 may be rotated to move the stop knob 41, so that the stop knob 41 of the switch member 40 may be moved into the retaining zone 232 of the guide slot 23 of the handgrip 21 and may be moved into the inner end wall 333 of the slide channel 332 of the retaining portion 33 of the fixing member 30. Thus, the stop knob 41 of the switch member 40 may be retained by the side stop wall 335, the stop wall 336 and the catch block 337, so that the fixing member 30 of the handle 20 is secured on the handgrip 21 of the handle 20.

In such a manner, the fixing member 30 of the handle 20 is fixed and will not retract into the handgrip 21 of the handle 20. The piston 13 is fixed on the fixing member 30 of the handle 20, so that the piston 13 is also secured on the handgrip 21 of the handle 20.

Figure 9:
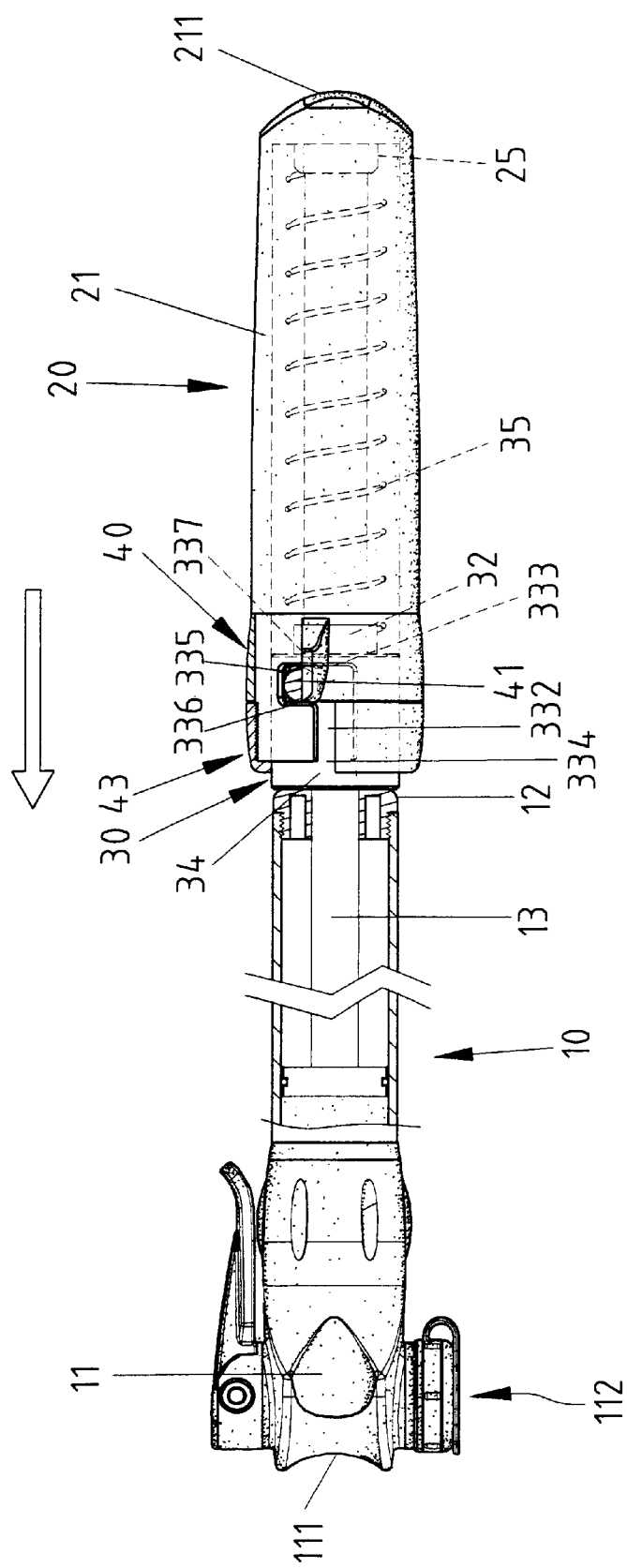
FIG. 9 is a plan cross-sectional operational view of the tire pump handle that may be operated between a locking position and a non-locking position by one hand only as shown in FIG. 8.
Figure 10:
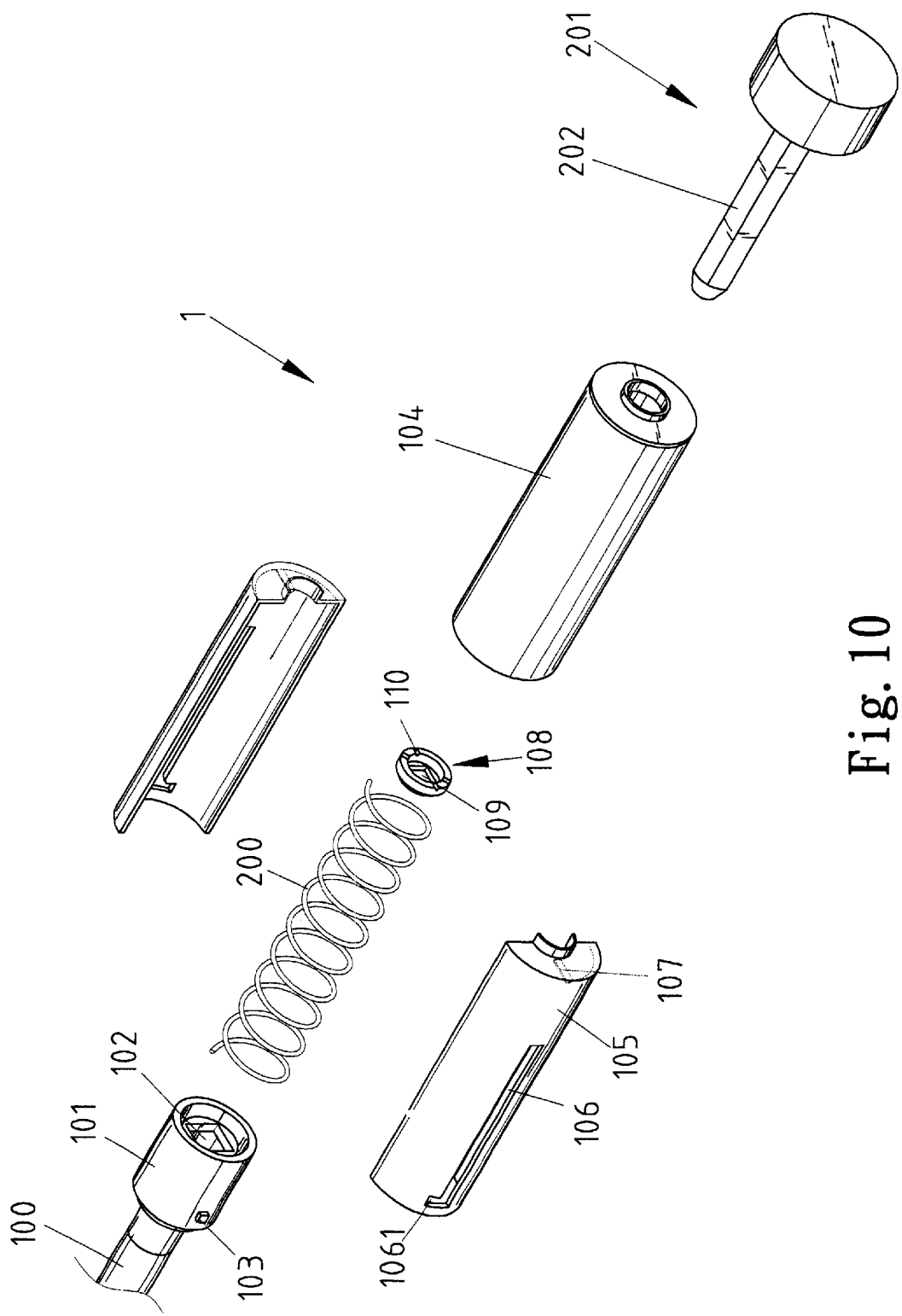
FIG. 10 is an exploded perspective view of a conventional tire pump handle in accordance with the prior art.
Figure 11:
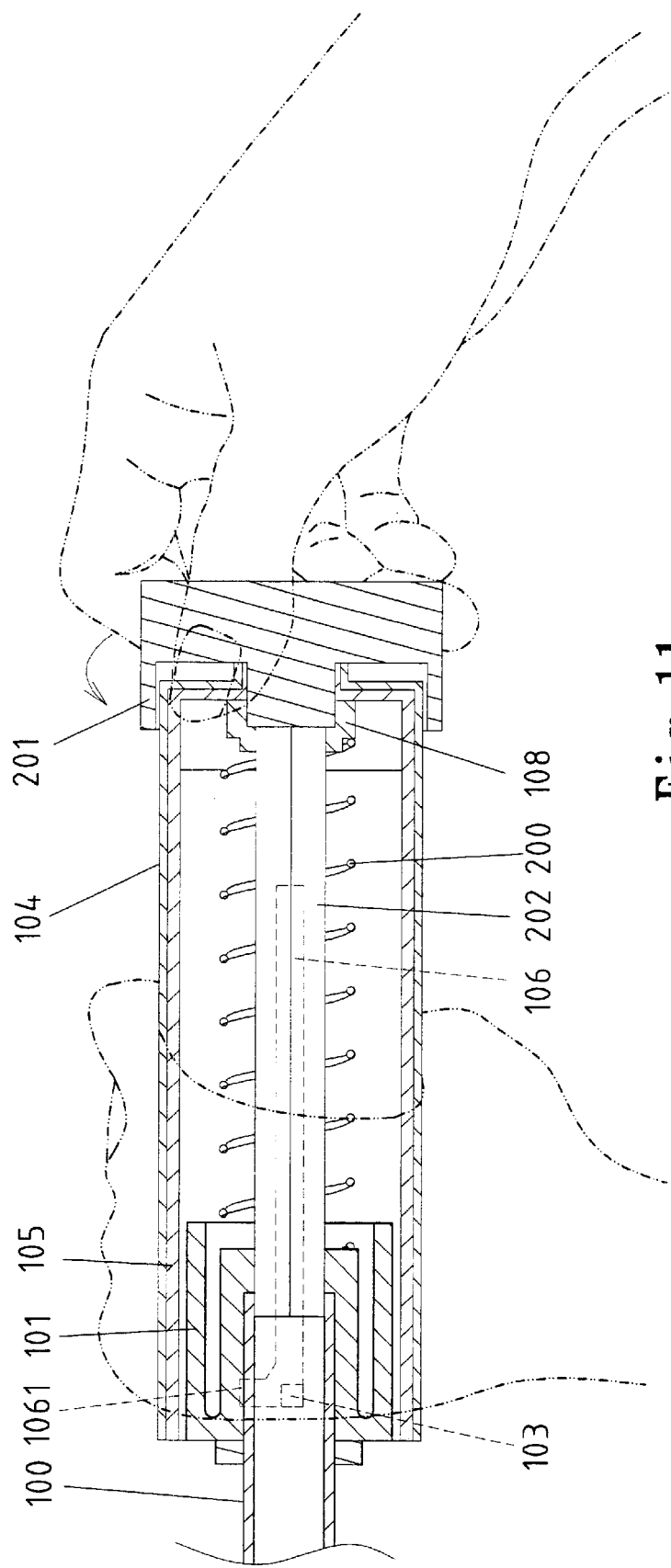
FIG. 11 is a plan cross-sectional assembly view of the conventional tire pump handle as shown in FIG. 10.
Figure 12:
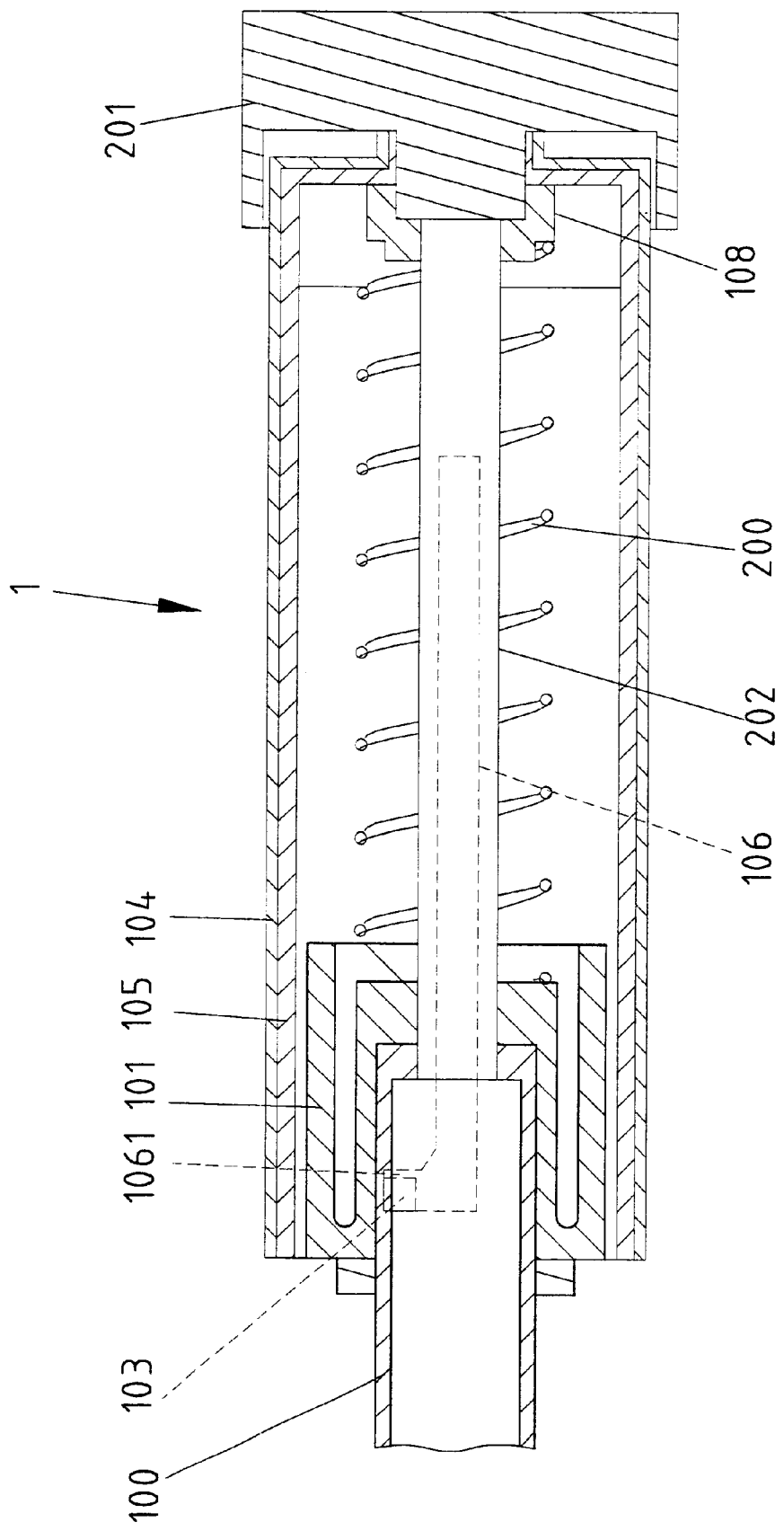
FIG. 12 is an operation view of the conventional tire pump handle as shown in FIG. 11.

As shown in FIG. 9, when the handgrip 21 of the handle 20 is pushed toward the cylinder 10, the piston 13 is pushed by the fixing member 30 of the handle 20 to be retracted into the cylinder 10 until the first end 31 of the cylindrical body 34 of the fixing member 30 of the handle 20 is rested on the second end 12 of the cylinder 10. Thus, the piston 13 may be driven by the handgrip 21 of the handle 20 to move in the cylinder 10 reciprocally so as to eject air outward from the nozzle head 112, thereby achieving the tire pumping purpose.

Accordingly, the tire pump in accordance with a preferred embodiment of the present invention has the following advantages.

1. The operation knob 42 of the switch member 40 may be driven and moved by the user's one hand only, so that the handle 20 of the tire pump may be operated between a locking position and a non-locking position by the user's one hand only, thereby greatly facilitating the user operating the handle 20 of the tire pump, and thereby greatly enhancing the versatility of the tire pump.

2. The tire pump has a simple construction, and the parts of the tire pump may be manufactured easily, thereby facilitating fabrication of the tire pump, and thereby saving cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A tire pump, comprising:

a reciprocal member having a first end and a second end; and a handle mounted on the reciprocal member and having a first end and a second end, the first end of the handle mounted on the second end of the reciprocal member, the handle including a switch member mounted on the first end thereof, wherein the switch member may be operated by a user's one hand only so that the switch member may be moved between a first position where the second end of the reciprocal member is fixed on the first end of the handle, and a second position where the second end of the reciprocal member may be retracted into the first end of the handle.

2. The tire pump in accordance with claim 1, wherein the handle includes:

a hollow handgrip having a first end formed with an opened end and a second end formed with a closed end, the switch member being rotatably mounted on the opened end of the handgrip; and a fixing member mounted in the handgrip and having a first end and a second end, the first end of the fixing member secured on the second end of the reciprocal member;

wherein, when the switch member is moved to the first position, the fixing member is fixed in the handgrip, and when the switch member is moved to the second position, the fixing member may be retracted into the handgrip.

3. The tire pump in accordance with claim 2, wherein the opened end of the handgrip has an outer wall formed with a rotation zone, the rotation zone is formed with an L-shaped guide slot which has a retaining zone, the fixing member has an outer periphery formed with an L-shaped slide channel aligned with the guide slot of the handgrip, the slide channel has a stop wall, the switch member is rotatably mounted on the rotation zone of the handgrip, and has an inner wall provided with a stop knob which is extended into the guide slot of the handgrip and the slide channel of the fixing member;

when the switch member is moved to the first position, the stop knob of the switch knob is received in the retaining zone of the guide slot of the handgrip and is retained by the stop wall of the slide channel of the fixing member, so that the fixing member is fixed in the handgrip; and when the switch member is moved to the second position, the stop knob of the switch knob is received in the guide slot of the handgrip and may slide in the slide channel of the fixing member, so that the fixing member may be retracted into the handgrip.

4. The tire pump in accordance with claim 3, wherein the rotation zone of the opened end of the handgrip has outer diameter smaller than that of the handgrip, thereby defining a step therebetween.

5. The tire pump in accordance with claim 3, wherein the guide slot of the handgrip has a first section formed with an opening connected to the opened end and a second section vertical to the first section and formed with the retaining zone.

6. The tire pump in accordance with claim 3, wherein the slide channel of the fixing member has an inner end wall and an opened end, the inner end wall is vertically connected to a side stop wall which is connected to the stop wall, the side stop wall may limit a transverse movement of the stop knob of the switch knob in the slide channel of the fixing member.

7. The tire pump in accordance with claim 6, wherein the inner end wall of the slide channel of the fixing member has a mediate portion formed with a catch block.

8. The tire pump in accordance with claim 3, wherein the switch member has an outer wall provided with an operation knob aligned with the stop knob.

9. The tire pump in accordance with claim 2, wherein the handgrip has an inner wall formed with a locking portion, and the fixing member has two sides formed with two opposite locking planes that may be secured in the locking portion of the handgrip, so that the fixing member will not rotate relative to the handgrip.

10. The tire pump in accordance with claim 2, wherein the handle further includes an elastic member mounted in the handgrip and biased between the second end of the fixing member and the closed end of the handgrip.

11. The tire pump in accordance with claim 10, wherein the handgrip is provided with a lug located adjacent to the closed end, the second end of the fixing member is formed with a protruded portion, and the elastic member has a first end secured to the protruded portion of the fixing member, and a second end secured to the lug of the handgrip.

12. The tire pump in accordance with claim 2, wherein the handle further includes a rotary cap secured on the opened end of the handgrip for retaining the switch member on the handgrip.

13. The tire pump in accordance with claim 12, wherein the rotary cap has an inner wall formed with an inner thread screwed on an outer thread of the opened end of the handgrip.

14. The tire pump in accordance with claim 12, wherein the fixing member is formed with a step, and the rotary cap has an inner wall formed with a stop flange rested on the step of the fixing member, thereby preventing the fixing member from detaching from the opened end of the handgrip.

15. The tire pump in accordance with claim 14, wherein the fixing member includes a cylindrical body and a retaining portion formed on an outer periphery of the cylindrical body, and the step of the fixing member is formed between the retaining portion and the cylindrical body.

16. The tire pump in accordance with claim 15, wherein the cylindrical body of the fixing member has one end secured on the second end of the reciprocal member.

17. The tire pump in accordance with claim 1, wherein the reciprocal member is a piston.

18. The tire pump in accordance with claim 1, further comprising a cylinder, wherein the reciprocal member is slidably mounted in the cylinder.

* * * * *